United States Patent
Heaton et al.

(10) Patent No.: US 7,484,234 B1
(45) Date of Patent: Jan. 27, 2009

(54) METHOD AND APPARATUS FOR CONTROLLING AT LEAST ONE SET-TOP BOX

(75) Inventors: Kurt Heaton, Pleasanton, CA (US); Alan Waterman, Los Gatos, CA (US); Jean Kao, Cupertino, CA (US)

(73) Assignee: TiVo Inc., Alviso, CA (US)

( * ) Notice: Subject to any disclaimer, the term of this patent is extended or adjusted under 35 U.S.C. 154(b) by 0 days.

(21) Appl. No.: 09/558,410

(22) Filed: Apr. 24, 2000

(51) Int. Cl.
*H04N 7/18* (2006.01)
*H04N 5/44* (2006.01)
*H04N 5/95* (2006.01)

(52) U.S. Cl. .................... 725/80; 725/141; 386/86; 348/734

(58) Field of Classification Search ............ 725/80, 725/40, 48, 59; 348/734; 386/86
See application file for complete search history.

(56) References Cited

U.S. PATENT DOCUMENTS

| | | | |
|---|---|---|---|
| 4,703,359 A | | 10/1987 | Rumbolt et al. |
| 5,341,166 A | | 8/1994 | Garr et al. |
| 5,629,868 A | | 5/1997 | Tessier et al. |
| 5,691,710 A | | 11/1997 | Pietraszak et al. |
| 5,796,423 A | * | 8/1998 | Robbins et al. ............ 725/151 |
| 6,057,874 A | * | 5/2000 | Michaud .................... 725/141 |
| 6,081,855 A | * | 6/2000 | deCarmo ..................... 710/62 |
| 6,169,879 B1 | * | 1/2001 | Perlman ..................... 725/119 |
| 6,239,718 B1 | * | 5/2001 | Hoyt et al. ............. 340/825.22 |
| 6,380,984 B1 | * | 4/2002 | Inoue et al. ................. 348/569 |
| 6,476,947 B1 | * | 11/2002 | Harvey ...................... 398/106 |
| 6,530,085 B1 | * | 3/2003 | Perlman ...................... 725/82 |
| 6,658,663 B1 | * | 12/2003 | Bruynsteen ................. 725/134 |
| 2002/0140569 A1 | | 10/2002 | van Ee et al. |

FOREIGN PATENT DOCUMENTS

WO 98/23088 5/1998

OTHER PUBLICATIONS

Barry Cooper, Web TV PLus-An Improvement, TARA news, Feb. 1998 http://www.n2ty.org/newsletter/980205.htm.*

* cited by examiner

*Primary Examiner*—Hunter B. Lonsberry
(74) *Attorney, Agent, or Firm*—Kirk D. Wong; Hickman Palermo Truong & Becker LLP

(57) ABSTRACT

A method and apparatus for providing control of a set-top box through IR blasting control by a system containing at least one computer is discussed. The system is coupled to a mass storage system. The system includes an IR control database that resides on the mass storage system. The IR control database contains at least one IR control entry and an IR control packet. The IR control packet is generated from a first IR control entry of the IR control database. The system controls a set-top box by serial transmission of the IR control packet.

39 Claims, 7 Drawing Sheets

METHOD AND APPARATUS FOR CONTROLLING AT LEAST ONE SET-TOP BOX

TECHNICAL FIELD

This invention relates to controlling set-top boxes in a television-related environment.

BACKGROUND ART

Originally, televisions possessed a simple user interface containing a channel selector, volume control and little else. Since the advent of video tape technology, these controls have been extended far beyond this.

A standard approach to controlling what are now known as set-top boxes is the use of hand held remote control devices using Infra-Red (IR) signals to communicate with set-top boxes and recently with additional devices, often found in home entertainment centers. There have been set-top control units also controlling other devices with this IR blasting technology which are not hand held. To date, these IR blasters have been driven by an embedded microprocessor using an embedded non-volatile memory chip to store the control tables specifying the IR signaling required for communication with various devices. Such devices are now pervasive throughout the consumer electronics of many continents.

However, such devices have some limitations that often cause significant frustration. Non-volatile memory chips used in such IR controllers offer limited amounts of memory, usually no more than one megabit. Such small memories are limited in terms of holding the rapidly growing database of distinctive device protocols in use by the various consumer devices. It is a common problem that a device operating in the correct frequency range cannot generate the necessary signaling to adequately communicate with a newly purchased device such as a set-top box component in a home entertainment center.

Another problem often encountered, even when a device may be able to add the control information to communicate with a new device, is that there is no readily supported mechanism by which that information can be programmed into the non-volatile memory chip.

Another problem encountered is the inability of contemporary IR controllers to select channels located on both A and B switch settings of a set-top box. Worse yet, existing IR controllers are further unable to select channels on these two setting as well as support the C band setting used in some satellite television services.

Another problem encountered in contemporary IR controllers is that different set-top boxes require essentially syntactic presentation controls. These set-top boxes have different responses to signals, often requiring specific minimum delays between digits or symbols being IR blasted to them. Another similar problem comes in the use of enter or cancel keys to delimit ending an IR blasting sequence. Another similar problem is establishing how many digits are expected to define a channel. In each of these problems, variations among different set-top boxes lead to a lack of uniformity challenging the patience of consumers, because today, there is no solution to any of these problems.

To summarize, what is needed includes IR blasting controls not limited to a small non-volatile memory capacity for holding signaling details for various units controlled by IR blasting. What is further needed includes a mechanism or method for rapidly updating an existing IR blaster control unit to incorporate signaling details for new devices. What is also further needed is a flexible ability to support channel selection on A/B switch and A/B/C switch controlled set-top box systems. What is further needed is a method of solving essentially syntactic presentation control problems.

DISCLOSURE OF THE INVENTION

Various embodiments solve all of these problems.

Certain embodiments include a method and apparatus for providing control of a set-top box through IR blasting control by a system containing at least one computer: the system is coupled to a mass storage system. These embodiments include providing an IR control database residing on the mass storage system where the IR control database contains at least one IR control entry, providing an IR control packet where the IR control packet is generated from a first IR control entry of the IR control database, and providing control to the set-top box by serial transmission of the IR control packet.

These embodiments are advantageous in providing an IR control database residing on the mass storage system. Such solutions remove any memory constraints on the size of the IR control database, thus solving the memory constraint problem of the prior art.

Certain further embodiments additionally include the following: Providing an IR control database residing on the mass storage system, where the IR control database contains at least one IR control entry; providing reception of an IR control entry to create a received IR control entry; and providing insertion of the received IR control entry to create the first IR control entry of the IR control database.

Such embodiments are advantageous in supporting the reception of updates and additions to the IR control database remotely. By way of example, such embodiments facilitate IR blasting control code signaling protocol upgrades as new equipment is integrated into a home entertainment system.

Certain further embodiments additionally include the following: Providing a raw IR control library residing on the mass storage system, where the raw IR control library contains a first raw IR control entry; providing library parsing of the first raw IR control entry of the raw IR control library to create a processed first IR control entry; and providing communication of the processed first IR control entry to create the first IR control entry of the IR control database.

Such embodiments advantageously support a raw IR control library to be acquired, shared and updated with other manufacturers.

Certain other further embodiments additionally include the following: Providing a prototype IR control database residing on the mass storage system, where the prototype IR control database contains a first prototype IR control entry; providing a control code search accessing the prototype IR control database to select a first prototype IR control entry; and generating from the first IR control entry the first raw IR control entry of the raw IR control library.

Such embodiments are advantageous in providing a systematic interface between a prototype laboratory and the raw IR data library. Such an interface permits automated updating of the raw IR data library, which in turn supports automated updating of the IR control database through the library parsing mechanism.

Certain other further embodiments additionally include the following: Providing a corrections-additions database residing on the mass storage system, where the corrections-additions database contains a first correction data entry; and providing the library parsing of the first correction data entry and of the first raw IR control entry to create the processed first IR control entry.

Such embodiments advantageously support corrections and additions to the control code tables which may be the result of continued testing beyond a prototype initial coding situation.

Certain other further embodiments additionally include the following: The processed first IR control entry includes a first processed IR control entry syntax specification; and the first IR control entry of the IR control database includes a first IR control syntax specification. Such embodiments advantageously support including essentially syntactic presentation controls into an IR control entry.

Certain further embodiments comprise a first IR control syntax specification which is included in the first IR control entry of the IR control database, including a number of digits in a channel specification. Such embodiments advantageously support specification of the number of digits in a channel specification.

Certain other further embodiments comprise a first IR control syntax specification entry which is included in the first IR control entry of the IR control database, including a delimiter specification ending an IR blast. Such embodiments advantageously support delimiter specifications ending an IR blast.

Certain other further embodiments include the first IR control syntax specification entry which is included in the first IR control entry of the IR control database, including a delay specification between digits of an IR blast. Such embodiments advantageously support specifying delays between digits of an IR blast.

Certain other further embodiments include the first IR control syntax specification entry included in the first IR control entry of the IR control database including a prefix specification. Such embodiments advantageously support specifying prefix symbols in an IR blast.

Certain further embodiments comprise a prefix specification which is included in the first IR control syntax specification entry which is, in turn, included in the first IR control entry of the IR control database and which comprises an A/B switch prefix selection. Such embodiments advantageously support channel selection of both A channels and B channels.

Certain other further embodiments comprise a prefix specification which is included in the first IR control syntax specification entry which is, in turn, included in the first IR control entry of the IR control database and which comprises an A/B/C switch prefix selection. Such embodiments advantageously support additional channel selection of C channels.

Certain other further embodiments additionally comprise a system containing one computer. Such embodiments advantageously include the ability to develop prototyping IR blasting codes in an environment containing the standard (lower cost) consumer version to insure compatibility.

Certain other further embodiments additionally comprise a system containing a first computer and a second computer. The mass storage system comprises a first mass storage system coupled to the first computer and a second mass storage system coupled to the second computer. The IR control database comprises a first instance of the IR control database residing on the first mass storage system coupled to the first computer. The raw IR control library resides on the second mass storage system containing the first raw IR control entry. The system provides reception of the IR control entry to create a received first IR control entry using a method which includes providing reception of the IR control entry to create the received first IR control entry at the first computer.

Such embodiments advantageously support distribution of library parsed data entries from a raw IR control library which resides on the second mass storage system coupled to the second computer to IR control database instances which resides on the first mass storage system coupled to the first computer. Note that in certain embodiments, the second computer is a server or distributor for IR control blasting code updates to numerous first computers in various consumers' set-top box control units.

Certain other further embodiments additionally include the system further containing a server computer system which provides reception of the IR control entry to create a received first IR control entry and that includes providing reception of the IR control entry to create a received first IR control entry by the server computer system.

Communication of the processed first IR control entry by the second computer to create the first IR control entry of the IR control database includes the following. Providing communication of the processed first IR control entry by the second computer to create the first IR control entry by the server computer system; and providing communication of the processed first IR control entry by the server computer system to create the first IR control entry of the first instance of the IR control database by the first computer.

Such embodiments advantageously provide a partitioning of the second computer and second mass storage system holding the raw IR control library from a server computer actually distributing IR control code updates to at least one first computer.

DETAILED DESCRIPTION OF THE INVENTION

Figure 1:
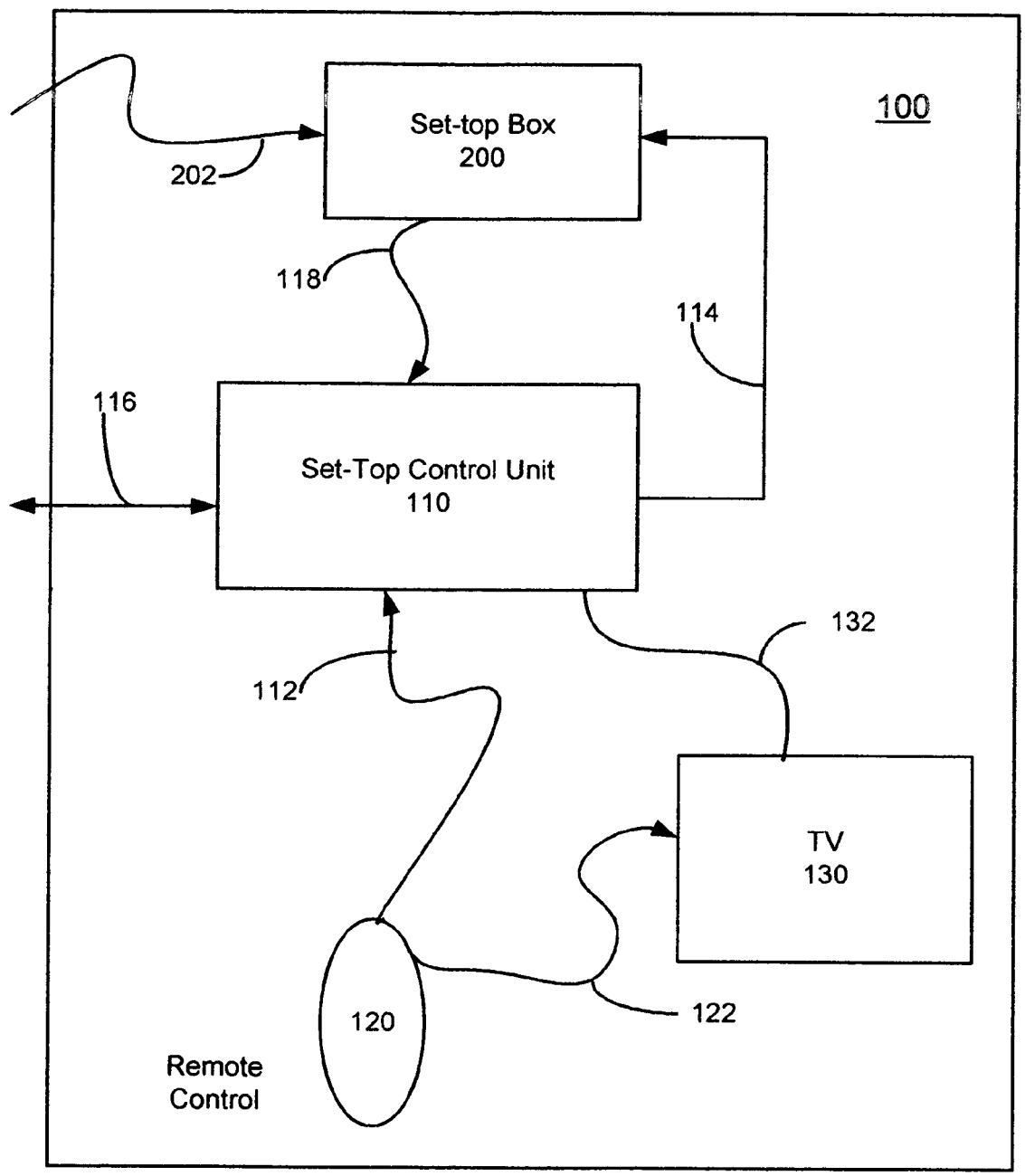
FIG. 1 depicts a system controlling a set-top box in accordance with certain embodiments.

FIG. 1 depicts a system 100 including set-top control unit 110 controlling an external set-top box 200 in accordance with certain embodiments.

Certain embodiments are implemented as an advanced set-top unit 110 packaged in a shipping container with cables, accessories, and a remote control 120. Certain further embodiments provide control of cable and satellite set-top boxes 200 by IR control 114. Certain embodiments support some satellite boxes 200 by serial control 114. In certain embodiments, remote control unit 120 may be a TiVo Remote Control Unit, manufactured by or for TiVo, Inc. of San Jose, Calif.

The television source 202 can be from one of four sources: 1) a roof-top antenna or rabbit ears receiving terrestrial analog broadcast, 2) a buried coaxial cable delivering analog and digital cable signals, 3) a satellite antenna receiver digital satellite broadcast, and 4) a roof-top antenna receiving terrestrial digital broadcast.

If the signal source 202 is from a roof-top or rabbit ear antenna, the user connects the cable from the antenna directly to the RF input on the Set-top control unit. The internal tuner in the Set-top control unit set-top box is used to select which program to view or record. The viewer selects which channel to tune to by using the remote control unit 120. After the selection is made, the Set-top control unit tunes its internal tuner to receive the channel selected.

If the signal source 202 is from a buried cable from a cable provider, the user can choose to 1) connect the cable to a analog set-top box, 2) connect the cable to a digital set-top box, or 3) connect the cable directly to the Set-top control unit. Note that in certain embodiments, the cable may be fiber optic. In certain other embodiments, the cable may be coaxial cable.

If the signal source 202 is from cable and the user has an analog cable set-top box, the cable is connected to the cable set-top box. Note that in certain embodiments, the cable may be fiber optic. In certain other embodiments, the cable may be coaxial cable. The cable set-top box contains an internal tuner that will be tuned to the channel the viewer wishes to view or record. The cable set-top box 200 is then connected 118 to the Set-top control unit 110 in one of two ways. 1) The channel selected is modulated onto either channel 3 or 4 and output on a RF connector. The RF connector is connected 118 to the RF input connector on the Set-top control unit 110 And the internal tuner 640 (see FIG. 2) in the Set-top control unit 110 is tuned to channel 3 or 4 to receive the channel. 2) The channel selected is output on either a composite or s-video connectors. These connectors are connected 118 to composite or s-video inputs on the Set-top control unit 110. If available, the preferred connection 118 is using s-video; if s-video is not provided then the preferred connection 118 is composite in certain embodiments. Both s-video and composite provide higher quality connections 118 than RF in certain embodiments.

The viewer selects which channel to tune to by using the Remote Control Unit 120. After the selection is made, the set-top control unit 110 transmits an IR signal 114 to the Cable set-top box 200 and the Cable set-top box 200 tunes its internal tuner to the channel. The channel is passed to the set-top control unit 110 by either the RF, composite, or s-video outputs. The set-top control unit 110 must be configured to receive the channel from its RF, composite, or s-video inputs. If the RF input is selected, the Set-top control unit 110 must also tune its internal tuner 640 (see FIG. 2) to either channel 3 or 4, depending upon which channel the cable box 200 is configured to receive the signal.

If the signal source 202 is from cable and the user has a digital cable set-top box 200, the cable 118 is connected to the digital cable set-top box 200. Note that in certain embodiments, the cable may be fiber optic. In certain other embodiments, the cable may be coaxial cable. The digital cable set-top box 200 contains an internal tuner that will be tuned to the channel the viewer wishes to view or record. The cable set-top box 200 connects 118 to the set-top control unit 110 in one of two ways. 1) The selected channel is modulated on either channel 3 or 4 and output on a RF connector. The RF connector is connected to the RF input connector on the Set-top control unit 110. And the internal tuner in the Set-top control unit 110 is tuned to channel 3 or 4 to receive the channel. 2) The channel selected is output on either a composite or s-video connectors. These connectors are connected to composite or s-video inputs on the Set-top control unit 110. Using the s-video connectors in certain embodiments provides the highest quality connection.

The viewer selects which channel to tune to by using the TiVo Remote Control Unit 120. After the selection is made, the Set-top control unit 110 transmits 114 an IR signal to the digital cable set-top box 200 and the digital cable set-top box 200 tunes its internal tuner to the channel. The channel is passed 118 to the TiVo set-top unit 110 by either the RF, composite, or s-video outputs. The TiVo set-top unit 110 must be configured to receive 118 the channel from its RF, composite, or s-video inputs. If the RF input is selected, the Set-top control unit 110 must also tune its internal tuner 640 (see FIG. 2) to either channel 3 or 4, depending on which channel the digital cable box 200 is configured to receive the signal.

If the signal source 202 is from a satellite antenna, the satellite receiver digital set-top box 200 is connected 118 to the Set-top control unit 110 in an identical fashion as described above for a digital cable set-top box 200. As many satellite receivers also require a cable or terrestrial broadcast antenna to receive local channels, the preferred connection for a satellite receiver is using the s-video connectors in certain embodiments for the highest quality connection. Such connection also leaves the RF input connection on the Set-top control unit 110 free to attach cable or roof-top antenna to receive local channels.

Some digital satellite receivers support serial data ports. If so, rather than use IR to control the satellite receiver set-top box 200, the serial output port 508 (see FIG. 2) on the Set-top control unit 110 can be connected 114 to the serial data port on the satellite receiver.

If the signal source 202 is from a digital terrestrial antenna and the digital terrestrial set-top box 200 provides an option to output standard NTSC compatible video on either RF, composite, or s-video outputs. Then one of these outputs can be connected 118 to the corresponding input on the Set-top control unit 110. The digital terrestrial set-top box 200 is connected 118 to the Set-top control unit 110 in an identical fashion as described above for a digital cable set-top box 200. The connection 118 using s-video provides the highest quality connection in certain embodiments.

Certain embodiments provide server based services through modem access 116. Certain further embodiments provide server based services that include TiVo™ Services through modem access 116.

Certain further embodiments support at least some of the following features: Records television programming in digital form on at least one internal hard disk drive. Certain further embodiments support 14 hours of recorded programming and certain other further embodiments support 30 hours of programming. Certain embodiments support digital recording of audio-video content including random access to tilted programming. Certain further embodiments support digitally accurate fast forward, rewind, slow motion, frame forward, frame back and high-quality freeze frame. Certain embodiments provide a 30 minute buffer of live programming being viewed enabling view to pause, rewind and fast forward live TV.

Certain embodiments provide instant replay of live or recorded sporting events and educational programs. Certain embodiments provide a bookmarking feature to record to save the rest of a current program being watch to view later. Certain embodiments provide programmable scheduling by time and channel, just like a VCR. Certain embodiments allow viewers to save recorded programs to their VCRs. Certain embodiments provide selectable recording quality.

Figure 2:
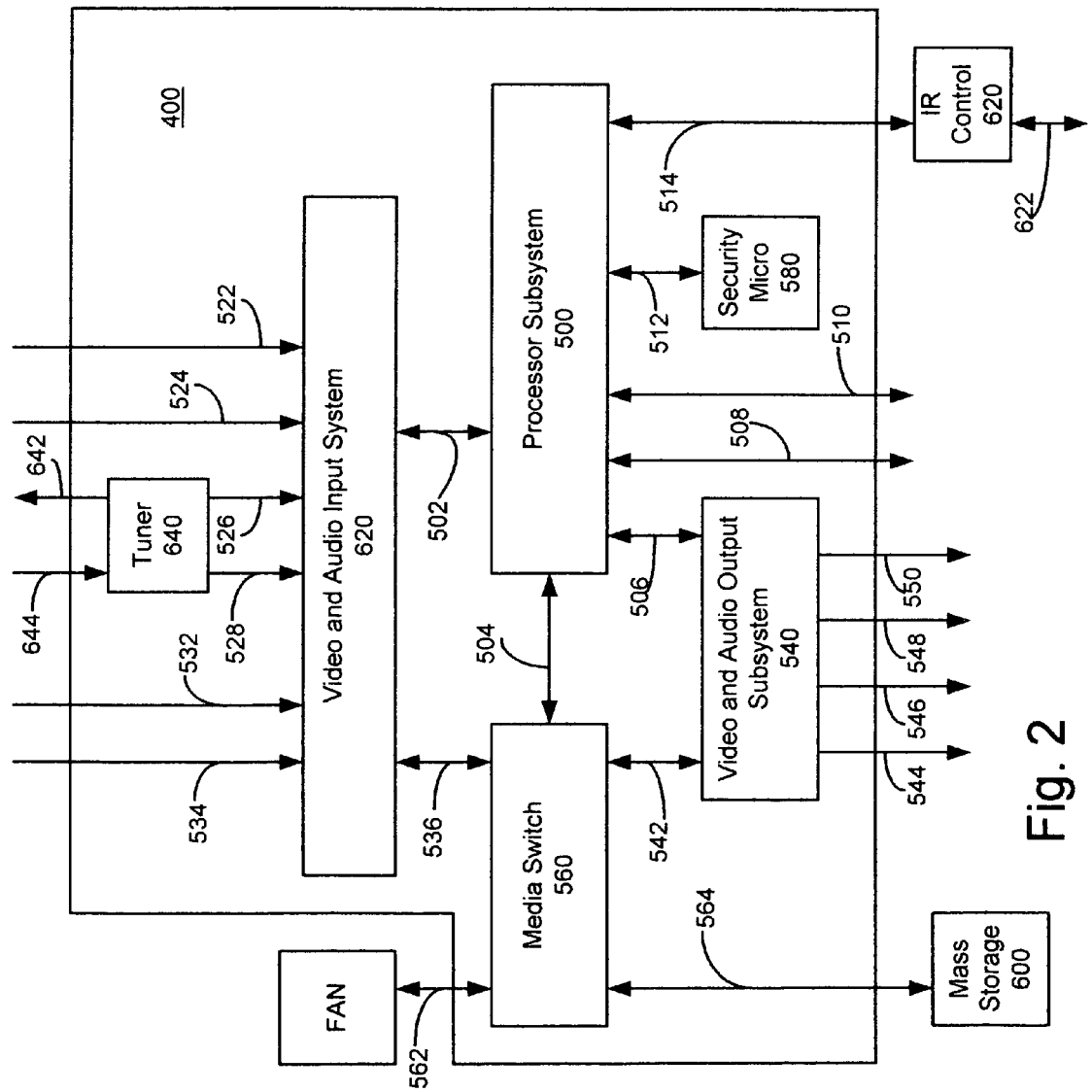
FIG. 2 depicts a system block diagram in accordance with certain embodiments.

Certain embodiments provide a RF input 644 with tuner 640, which is compatible with cable and terrestrial broadcast TV (see FIG. 2). Certain embodiments provide selectable RF input on channel 3. RF input on channel 4, composite or S-Video input support for analog cable, digital cable, or satellite set-top boxes.

In certain embodiments, a set-top control unit 110 electronics are housed in a metal enclosure approximately 17 inch wide, 13 inches deep and 4 inches high. The receiver supports one disk drive, providing up to 14 hours of program storage. In certain other embodiments, a 30 hour model of Set-top control unit 110 is identical to the 14 hour model except it supports two disk drives, providing up to 30 hours of program storage.

Television 130 is fed 132 from set-top control unit 110 in certain embodiments. In certain further embodiments, connection 132 feeds signals from a composite video output 550 (see FIG. 2) of set-top control unit 110. In certain other further embodiments, connection 132 feeds signals from an S-video output 548 (see FIG. 2) of set-top control unit 110.

In certain embodiments, remote control unit 120 provides a wireless 122 control television 130.

FIG. 2 depicts a system block diagram set-top control unit 110 in accordance with certain embodiments.

In certain embodiments, the electronics of set-top control unit 110 consists of a main System Board 400, an IR Controller Board (IR Ctrl) 620, a mass storage system 600, a Fan, and a Power Supply. Set-top control unit 110 supports one left-right stereo pair audio input 532-534, one composite video input 522, one S-Video input 524, one RF input 644 and one RF output 642 modulated onto either channel 3 or 4.

Mass storage system 600 may include one or two IDE Disk Drives in certain embodiments. Set-top control unit 110 mass storage system 600 supports 1 or 2 IDE disk drives providing storage for up to 30 hours of programming.

The set-top control unit 110 provides at least one left-right stereo pair audio outputs 544-546, at least one composite video output 550, at least one S-Video output 548, at least one serial input/output 508, at least one IR blaster output 622, and at least one modem input/output 510 which may be connected 116 to an associated phone line in certain embodiments. In certain further embodiments, a 33.3 Kbit modem is used.

The electronics within the area denoted by 400 is located on the System Board. The IR Controller Board (IR Ctrl) 620 is manufactured as part of the System Board, detached during assembly, and electrically connected with a ribbon cable. This allows the IR Controller board 620 to be physically attached to the front panel of the enclosure. The disk drive(s) in mass storage system 600 are connected by a ribbon cable 564 to the System Board 400. The Fan is connected to the System Board 400 with a cable 562. The Power Supply is connected to the System Board 400 and mass storage system 600 with power cables.

The system board 400 can be generally divided into 1) subsystems that convert analog video and audio from analog to digital data, 2) subsystems that process digital audio and video data, and 3) subsystems that convert digital data back to analog.

The Tuner subsystem 640 and video and audio input subsystem 620 accept as input standard analog video and audio signals from set-top boxes, roof-top antennas, or rabbit ear antennas. The video and audio input subsystem 620 converts these signals into digital media streams.

The digital media streams 536 and 502 are processed and stored in the mass storage system 600 by Media Switch 560 and Processor Subsystems 500. Media streams 542 selected by the user to view are retrieved 564 from the mass storage system 600 by the Media Switch 560 and Processor Subsystem 500. Retrieved media stream 542 is converted from digital to analog by the Video and Audio Output Subsystem 540. Media Switch 560 and Processor Subsystem 500 also perform miscellaneous house keeping functions such as temperature monitoring and fan control 562. The Security Microprocessor 580 performs system identification and authentication for security purposes.

The System Board partitions into CPU, Input, and Output Subsystems. Each subsystem will be discussed in more detail below.

The Processor subsystem 500 includes the following in certain embodiments. The CPU is an IBM Power PC. The boost ROM is a 1 mega-bit Flash. The main memory is 4 meg×32-bit, implemented using two 4096x×16-bit EDO RAMs. The IBM serial port is multiplexed to interface to the IR Controller Board and the Security Microprocessor. A second serial UART implements the external serial port that controls DSS Receivers. The modem is implemented with a Rockwell chipset and has an attached 1 mega-bit Flash that contains its microcode. The Media Switch ASIC controls multimedia streams to and from the disk drive. It also implements a number of system functions including the IDE disk drive controller, fan control and i2C bus control. The CPU Subsystem has a battery backed-up real-time clock and a temperature sensor interfaced to the i2C bus.

The i2C bus is also used to control 502 Video and Audio Input system 620 and to control 506 Video and Audio Output Subsystem 540.

The Video and Audio Input Subsystem 620 inputs video and audio from I/O connectors, converts it from analog to digital and encodes it using MPEG2 compression. Channel selection is performed with a tuner 640 when the RF input is selected. The video and audio are converted from analog to digital and then passed to a compression engine. In certain embodiments, only one video/audio source can be selected at a time to be processed by the compression engine.

The video compression is performed with an MPEG encoder chip set in certain embodiments. In certain embodiments, an MPEG encoder chip set coupled with RAM memories performs video compression. In certain further embodiments, the MPEG encoder chip set is composed of exactly one integrated circuit. A Sony MPEG2 encoder chip performs video compression in certain further embodiments. A DSP is used in certain embodiments to perform audio compression. In certain further embodiments, a DSP from Analog Devices is used to perform audio compression.

The Video and Audio Output Subsystem 540 decompresses video and audio cached on mass storage system 600, converts it back into analog signals, and drives the output connectors. Certain embodiments of set-top control unit 110 support at least one stereo pair of audio output, at least one composite video outputs, at least one S-Video output and at least one RF output modulated onto either channels 3 or 4. Certain further embodiments of set-top control unit 110 support at least two stereo pair of audio output and at least two composite video outputs.

The compressed video/audio stream 542 is transferred to an MPEG2 decoder chip set for decoding in certain embodiments. In certain further embodiments the MPEG decoder chip set is coupled to RAM memory. The compressed video/audio stream 542 is transferred to an IBM MPEG2 decoder chip with coupled RAM memory for decoding in certain further embodiments.

The uncompressed digital video, output by the MPEG decoder chip set, is sent to a video encoder to convert the video back into analog form before driving the video output connectors in certain embodiments. In certain further embodiments, a Philips video encoder chip performs the conversion. Audio is mixed with user interface sound effects before driving the audio output connectors in certain embodiments. Audio is converted from digital into analog and then mixed with user interface sound effects before driving the audio output connectors in certain further embodiments.

The IR Controller Board 620 contains an IR Microcontroller, an IR Photo receiver module, and LED's indicators. IR controller board 620 is connected 514 to the System Board with a ribbon cable that connects the IR Microcontroller to the Power PC using the Power PC's serial port in certain embodiments.

Set-top control unit 110 mass storage system 600 supports two disk drive bays in certain embodiments. The 14 hour Set-top control unit 110 has one 3-½ inch IDE disk drives in its mass storage system 600, supporting up to 14 hours of programming. The 30 hour Set-top control unit 110 has one or two 3-½ inch IDE disk drives in its mass storage system 600, supporting up to 30 hours of programming. The power for the disk drives is connected directly from the power supply. The IDE interfaces of the drives are connected 564 to the System board with a flat ribbon cable.

Note that in certain embodiments, IR control codes are stored in an IR control code database 1100 (see FIG. 3) residing on mass storage system 600.

Figure 3:
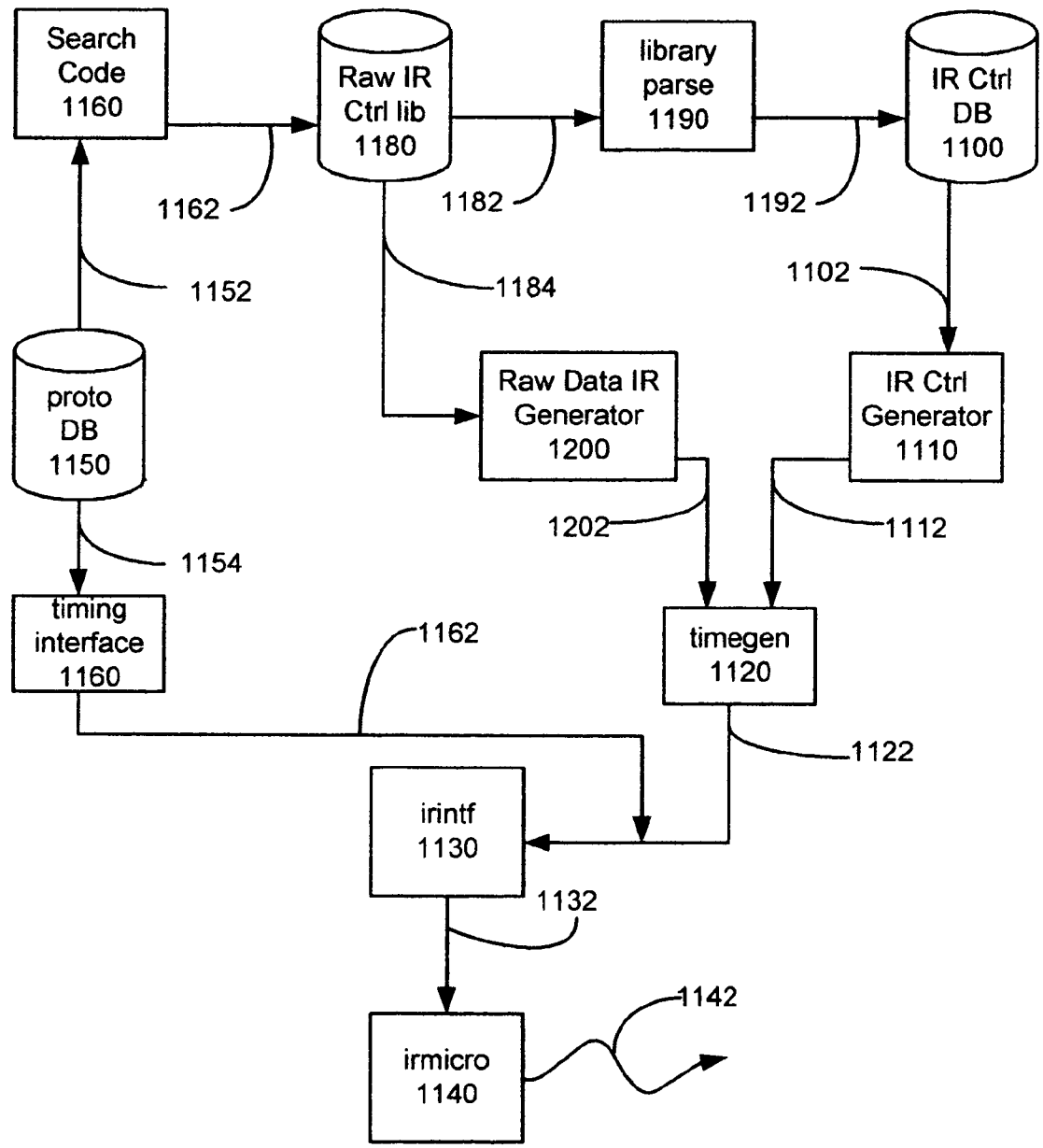
FIG. 3 depicts data flow regarding IR control of external set-top boxes in accordance with certain embodiments.

FIG. 3 depicts data flow regarding IR control of external set-top boxes in accordance with certain embodiments.

In certain embodiments, IR control database 1100 resides on the mass storage system 600 and contains at least one IR control entry. A first IR control entry is accessed 1102 to IR control generator 1110. IR control generator 1110 processes the IR control entry and sends 1112-1122 it to be prepared 1130 for presentation 1132 to a serial device 1140. Serial device 1140 serially transmits this presented information as control signals to an external set-top box.

In certain further embodiments, timing generation 1120 is performed before 1122 it is prepared 1130 for presentation 1132 to a serial device 1140. In certain embodiments, preparation 1130 includes processing similar to the "C" programming language function "sprintf". In certain further embodiments, preparation 1130 includes multiplexing serial streams to be sent to serial device 1140. In certain further embodiments, preparation 1130 includes queuing various multiplexed serial streams to be sent to serial device 1140.

In certain embodiments, the serial device 1140 includes at least one IR controller. In certain further embodiments, the serial device 1140 further includes a second serial device physical transport layer, which may include either wireline or wireless transport mechanisms.

In certain embodiments, raw IR control library 1180 resides on the mass storage system 600 and contains at least one raw IR control entry. A first raw IR control entry is assessed 1182 by a library parsing operation 1190 to create a processed first IR control entry. The processed first IR control entry is communicated 1192 and received 1192 to create a received first IR control entry. The received first IR control entry is inserted into IR control database 1100 as an IR control entry of the IR control database 1100.

In certain further embodiments, first raw IR control entry is accessed 1182 by a library parsing operation 1190 to create a processed first IR control entry syntactic specification. The processed first IR control entry syntactic specification is communicated 1192 and received 1192 to create a received first IR control entry.

Syntactic specifications provide for the specification of many crucial forms of communication information in an IR control entry. This includes but is not limited to specification of how many digits are in a channel. This also includes but is not limited to specifying whether an enter or cancel key is used at the end of IR blasting sequence to delimit channels. This also includes but is not limited to specifying delays between transmission of digits or symbols. This also includes but is not limited to specifying prefix keys. Prefix keys are not digits, which may used to delimit switch settings in certain embodiments. Many set-top boxes have an A/B switch, often with channels on both A and B switch settings. Some set-top boxes supporting satellite reception further have a C-band switch setting. This also includes but is not limited to specifying postfix keys. Postfix keys are not digits which alter the interpretation of the preceding IR blasting sequence.

Note that a syntactic specification may be the entire IR control entry, or a part of the entry.

This also includes but is not limited to syntactic specifying IR control entries further referencing other syntactic specifying IR control entries. This supports development of complex blasting codes to perform essentially macro operations.

In certain further embodiments, the first raw IR control entry is accessed 1184 by raw data IR generator 1200 to create a raw IR control packet, which processes the raw IR control packet and sends 1202-1122 it to be prepared 1130 for presentation 1132 to a serial device 1140. Serial device 1140 serially transmits this presented information as control signals to an external set-top box.

In certain further embodiments, timing generation 1120 is performed before 1122 it is prepared 1130 for presentation 1132 to a serial device 1140. In certain embodiments, preparation 1130 includes processing similar to the "C" programming language function "sprintf". In certain further embodiments, preparation 1130 includes multiplexing serial streams to be sent to serial device 1140. In certain further embodiments, preparation 1130 includes queuing various multiplexed serial streams to be sent to serial device 1140.

In certain embodiments, a prototype IR control database 1150 resides on mass storage system 600 containing at least one prototype IR control entry. A control code search 1160 accessing 1152 a first prototype IR control entry creates a first raw IR control entry for raw IR control library 1180. In certain further embodiments, the first prototype IR control entry is accessed 1154 by timing interface 1160 to create a first IR control packet, which then follows the same data flow 1122 as has been previously described. Note that in certain further embodiments, the prototype IR control database is compatible with the PRONTO device database, based upon the PRONTO products manufactured by Phillips.

Figure 4:
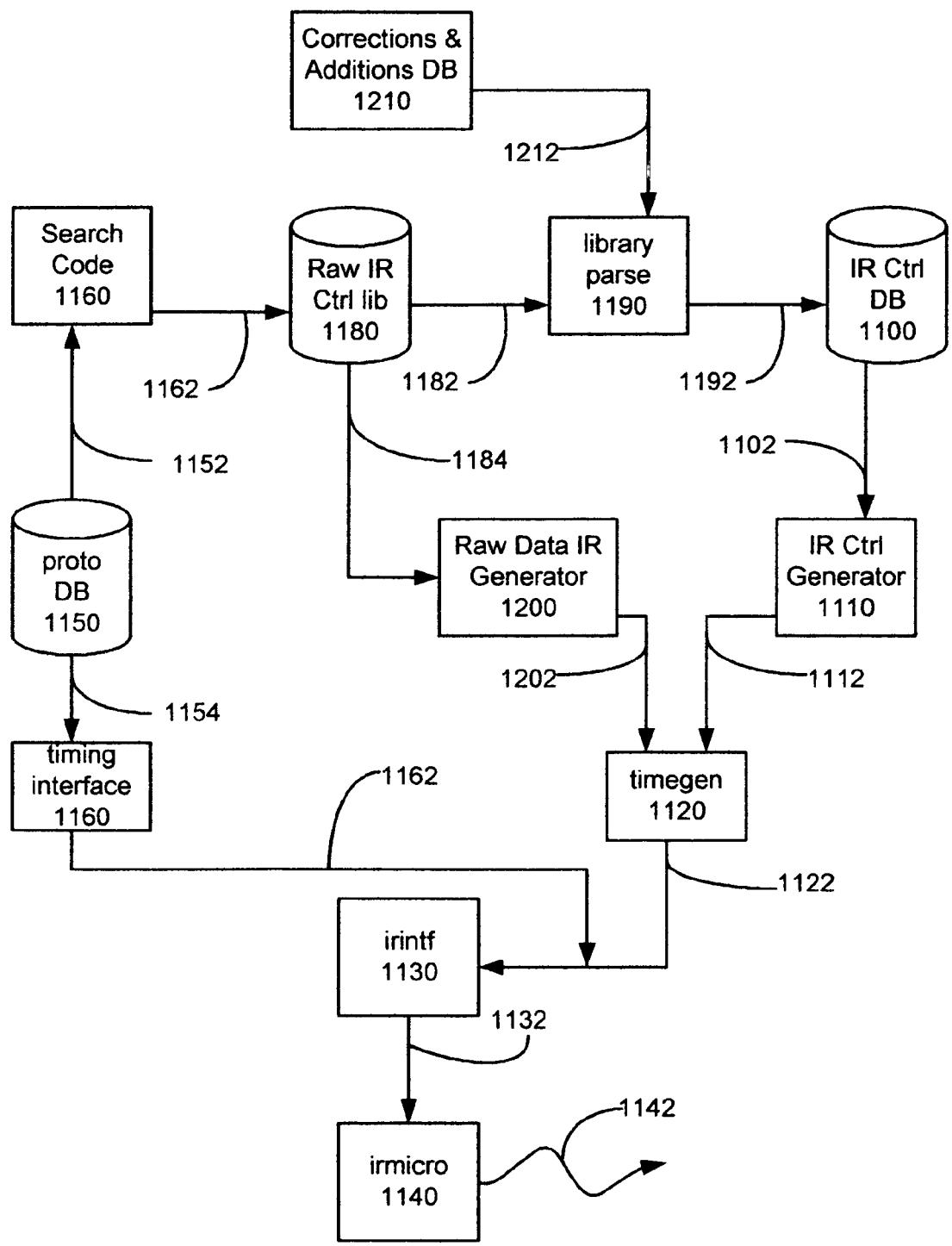
FIG. 4 depicts a refinement of FIG. 1 regarding IR control of external set-top boxes in accordance with certain embodiments.

FIG. 4 depicts a refinement of FIG. 1 regarding IR control of external set-top boxes in accordance with certain embodiments. Note that the entire discussion regarding FIG. 3 is applicable to this figure and will not be repeated to simplify and focus the discussion on the additional elements of this figure.

In certain embodiments, corrections-additions database 1210 resides on mass storage 600 and may contain a first correction entry. In addition to the first raw IR control entry being accessed 1182 by library parsing operation 1190 to create a processed first IR control entry, there are additional activities in certain further embodiments. A first raw IR control entry is accessed 1182 and a first correction entry is assessed 1212 by a library parsing operation 1190 to create a processed IR control entry. This processed IR control entry may replace the processed first IR control entry which was generated based strictly upon accessing 1182 the raw IR control library 1180. This processed IR control entry may be in addition to the processed first IR control entry which was generated based strictly upon accessing 1182 the raw IR control library 1180.

Figure 5:
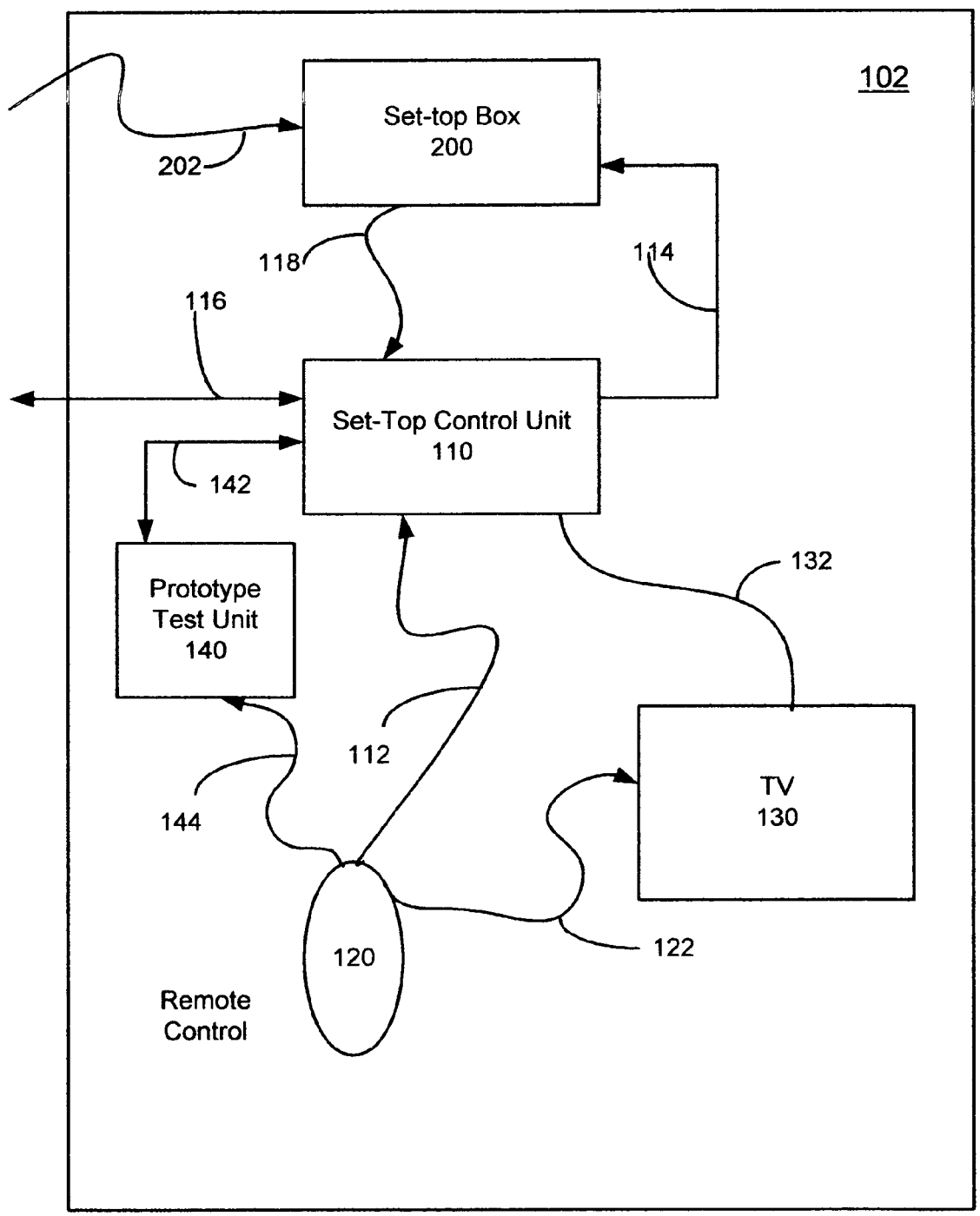
FIG. 5 depicts a system controlling a set-top box using a prototype test unit in accordance with certain embodiments.

FIG. 5 depicts a system controlling a set-top box using a prototype test unit in accordance with certain embodiments.

This figure is a refinement of FIG. 1, and shares all of the discussion of FIG. 1. As such that discussion will not be repeated and the focus herein will be on the interaction of the new element, a prototype test unit 140 which is coupled 142 to an implementation of set-top control unit 110 and further coupled 144 to the IR control unit 120.

In certain embodiments, a new IR control unit 120 may be encountered which possesses a distinctive control signaling protocol. Prototype test unit 140 receives the IR blasted codes from the remote control unit 120, which it then formats and enters into the prototype IR control database 1150 (see FIGS. 3 and 4). Through a procedure of successive experimental steps, the IR control codes necessary to fully interface with the remote control unit 120 are discerned and entered into the prototype IR control database 1150. Line 116 may then be used to transmit this updated or new information to other systems including set-top control units 110, or servers, which in turn may distribute such updated or new information to other systems including set-top control units 110.

Note that in almost all cases today, new set-top box units are shipped with a hand held remote control unit 120 which is specifically configured to work with the new set-top box unit. A user of a set-top box control unit as depicted in FIG. 1 need only ship the hand held IR control unit 120 to a central site containing a system as in this figure. The system as shown in this figure determines the specific IR control signaling needed to interface with the new set-top box. The communication line 116 of the consumer unit of FIG. 1 is then utilized to download the newly determined specific IR control signaling necessary to control their new set-top box unit.

Figure 6:
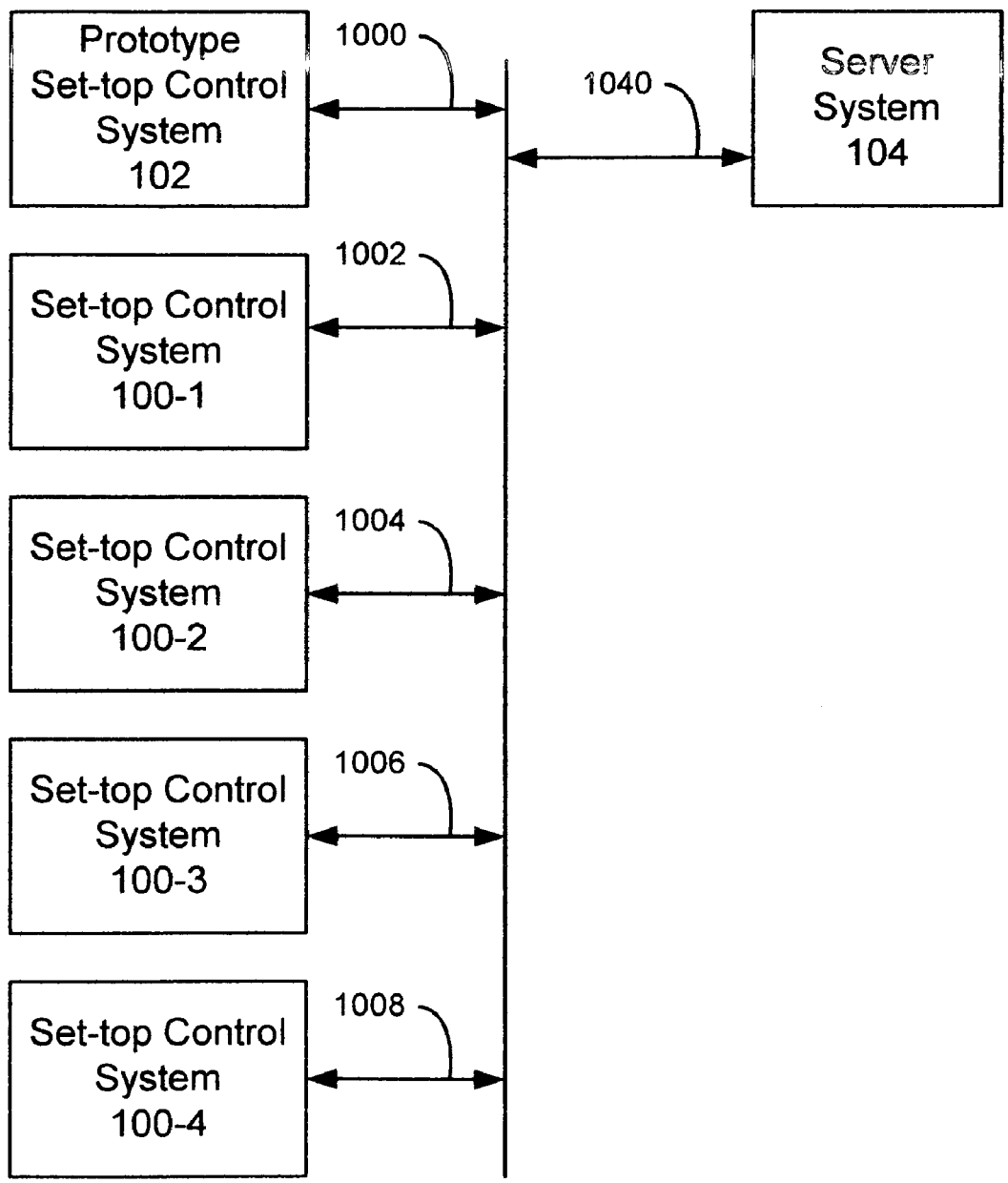
FIG. 6 depicts a network with server system 104, a prototype set-top control system 102 and multiple set-top control systems 100-1 to 100-4.

FIG. 6 depicts a network with server system 104, a prototype set-top control system 102 and multiple set-top control systems 100-1 to 100-4.

Continuing the discussion from the previous figure, this figure depicts an embodiment of the invention wherein multiple set-top control systems 100-1 to 100-4 share the advantages of access to prototype set-top control system 102. In certain embodiments, server system 104 may only act to distribute updates on a data entry by data entry level. In certain further embodiments server system 104 may store the entire IR control database for downloading by any of the 100 systems.

Figure 7:
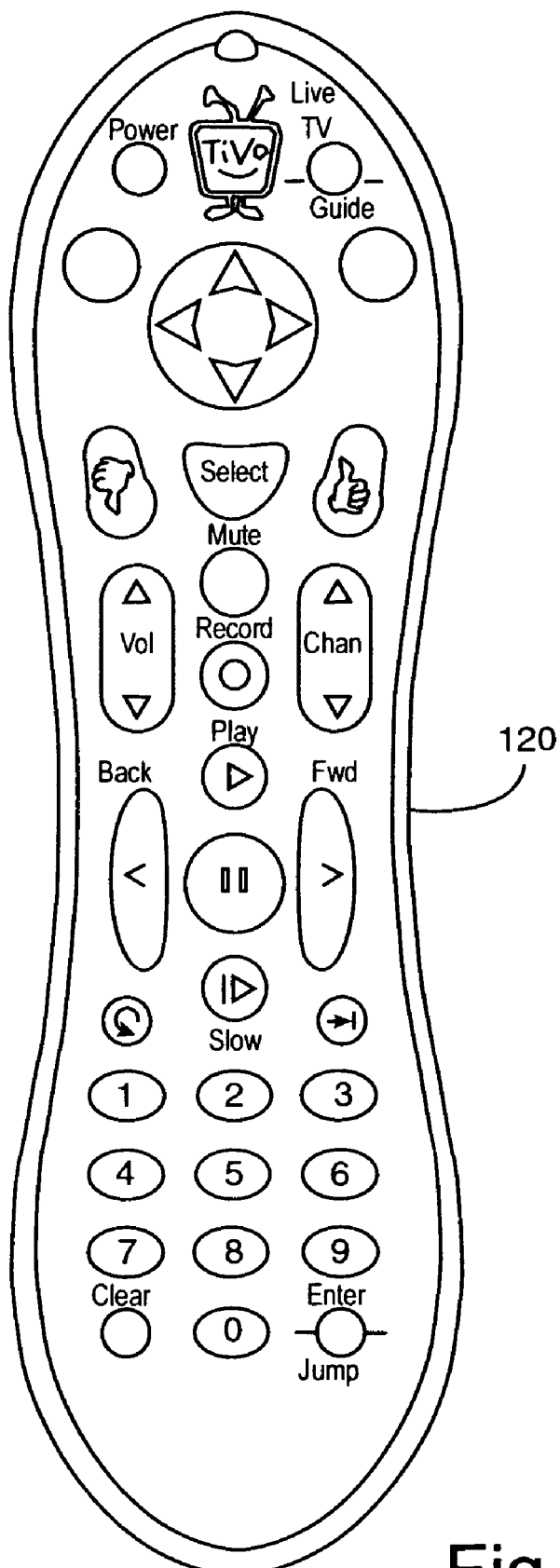
FIG. 7 depicts a hand held remote control unit 120 in accordance with certain embodiments.

FIG. 7 depicts a hand held remote control unit 120 in accordance with certain embodiments.

Note that the remove control 120 specification is detailed in a document entitled "Remote Control Specification SRCU-00001-000 A" which is included as appendix A herein.

Although the invention is preferably described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method for controlling of a set-top box, comprising the steps of:
generating an IR control packet from a first IR control entry of an IR control database residing on a local mass storage system in a set-top unit, wherein said IR control database contains a plurality of IR control entries;
controlling said set-top box with said IR control packet; and
wherein said set-top unit stores video and/or audio content received from said set-top box on said local mass storage system.

2. The method of claim 1, further comprising the steps of:
generating said IR control packet containing an IR control waveform from an IR waveform specification of said first IR control entry; and
transmitting said IR control packet, based upon said IR control waveform, to said set-top box;
wherein said first IR control entry of said IR control database contains said IR waveform specification.

3. The method of claim 2, wherein said transmitting step further comprises providing multiplexed serial transmission of said IR control packet based upon said IR control waveform to said set-top box.

4. The method of claim 2, wherein said transmitting step further comprises providing queued multiplexed serial transmission of said IR control packet based upon said IR control waveform to said set-top box.

5. The method of claim 1, further comprising the steps of:
receiving an IR control entry to create a received IR control entry; and
inserting said received IR control entry into said IR control database to create said first IR control entry of said IR control database.

6. The method of claim 5, further comprising the steps of:
providing a raw IR control library residing on said mass storage system, wherein said raw IR control library contains a first raw IR control entry;
parsing a first raw IR control entry of a raw IR control library to create a processed first IR control entry, said raw IR control library residing on said mass storage system, wherein said raw IR control library contains said first raw IR control entry; and
creating said first IR control entry of said IR control database from said processed first IR control entry.

7. The method of claim 6, further comprising the step of:
generating a raw IR control packet, wherein said raw IR control packet is generated from said first raw IR control entry of said raw IR control library;
wherein said controlling step controls said set-top box by transmission of said raw IR control packet.

8. The method of claim 6, further comprising the steps of:
performing a control code search to access a prototype IR control database to select a first prototype IR control entry, said prototype IR control database residing on said mass storage system, wherein said prototype IR control database contains a first prototype IR control entry; and
generating from said first IR control entry said first raw IR control entry of said raw IR control library.

9. The method of claim 8, further comprising the step of:
providing a timing interface wherein said first IR control packet is generated from said first prototype IR control entry of said prototype IR control database.

10. The method of claim 6, further comprising the steps of:
providing a corrections-additions database residing on said mass storage system, wherein said corrections-additions database contains a first correction data entry; and
parsing said first correction data entry and said first raw IR control entry to create said processed first IR control entry.

11. The method of claim 6, wherein said system contains a first computer and a second computer;
wherein said mass storage system contains a first mass storage system coupled to said first computer and a second mass storage system coupled to said second computer;
wherein said IR control database includes a first instance of said IR control database residing on said first mass storage system coupled to said first computer;

wherein said receiving step creates said received first IR control entry at said first computer;

wherein said insertion step inserts said received first IR control entry at said first computer to create said first IR control entry of said first instance of said IR control database residing on said first mass storage system;

wherein said raw IR control library resides on said second mass storage system containing said first raw IR control entry;

wherein said library parsing step creates said processed first IR control entry by said second computer; and wherein said communication step communicates said processed first IR control entry by said second computer to create said first IR control entry of said IR control database.

12. The method of claim 11, wherein said system further includes a server computer system;

wherein said receiving step creates a received first IR control entry by said server computer system; and said creating step includes the steps of:

sending said processed first IR control entry by said second computer to create said first IR control entry by said server computer system; and sending said processed first IR control entry by said server computer system to create said first IR control entry of said first instance of said IR control database by said first computer.

13. The method of claim 6, wherein said first IR control entry of said IR control database includes a first IR control syntax specification.

14. The method of claim 13, wherein said first IR control syntax specification includes a number of digits in a channel specification.

15. The method of claim 13, wherein said first IR control syntax specification entry includes a delimiter specification ending an IR transmission.

16. The method of claim 13, wherein said first IR control syntax specification entry includes a delay specification between digits of an IR transmission.

17. The method of claim 13, wherein said first IR control syntax specification entry includes a prefix specification.

18. The method of claim 17, wherein said prefix specification includes an A/B switch prefix selection.

19. The method of claim 17, wherein said prefix specification includes an A/B/C switch prefix selection.

20. An apparatus for controlling of a set-top box, comprising:

a local mass storage system in a set-top unit;

an IR control database residing on said mass storage system wherein said IR control database contains a plurality of IR control entries;

an IR control packet, wherein said IR control packet is generated from a first IR control entry of said IR control database;

a transmitter that controls said set-top box by transmitting said IR control packet thereto; and wherein said set-top unit stores video and/or audio content received from said set-top box on said local mass storage system.

21. The apparatus of claim 20, said IR control packet further comprising:

an IR control waveform based upon an IR waveform specification of said first IR control entry;

wherein said IR control packet is transmitted to said set-top box based upon said IR control waveform.

22. The apparatus of claim 21, wherein said transmitter provides multiplexed serial transmission of said IR control packet to said set-top box based upon said IR control waveform.

23. The apparatus of claim 21, wherein said transmitter provides queued multiplexed serial transmission of said IR control packet to said set-top box based upon said IR control waveform.

24. The apparatus of claim 20, further comprising:

means for creating a received IR control entry based upon reception of an IR control entry; and means for creating said first IR control entry of said IR control database based upon insertion of said received IR control entry into said IR control database.

25. The apparatus of claim 24, further comprising:

a raw IR control library residing on said mass storage system, wherein said raw IR control library contains a first raw IR control entry;

means for parsing said first raw IR control entry of said raw IR control library to create a processed first IR control entry; and means for communicating said processed first IR control entry to create said first IR control entry of said IR control database.

26. The apparatus of claim 25, further comprising:

a raw IR control packet, wherein said IR control packet is generated from said first raw IR control entry of said raw IR control library; and wherein said IR transmitter provides control to said set-top box by transmission of said raw IR control packet.

27. The apparatus of claim 25, further comprising:

a prototype IR control database residing on said mass storage system containing a first prototype IR control entry;

means for performing a control code search access on said prototype IR control database to select a first prototype IR control entry; and means for generating from said first IR control entry said first raw IR control entry of said raw IR control library.

28. The apparatus of claim 27, further comprising:

a timing interface, wherein said first IR control packet is generated from said first prototype IR control entry of said prototype IR control database.

29. The apparatus of claim 25, further comprising:

a corrections-additions database residing on said mass storage system, said corrections-additions database containing a first correction data entry; and means for parsing said first correction data entry and of said first raw IR control entry to create said processed first IR control entry.

30. The apparatus of claim 25, wherein said system further comprises a first computer and a second computer;

wherein said mass storage system further comprises a first mass storage system coupled to said first computer and a second mass storage system coupled to said second computer;

wherein said IR control database comprises a first instance of said IR control database residing on said first mass storage system coupled to said first computer;

wherein said creating a received IR control entry module creates said received first IR control entry at said first computer;

wherein said creating said first IR control entry module inserts said received first IR control entry at said first computer to create said first IR control entry of said first instance of said IR control database residing on said first mass storage system;

wherein said raw IR control library resides on said second mass storage system containing said first raw IR control entry;

wherein said library parsing creates said processed first IR control entry by said second computer; and wherein said communicating module communicates said processed first IR control entry by said second computer to create said first IR control entry of said IR control database.

31. The apparatus of claim 30, wherein said system further comprises a server computer system;

wherein said creating a received IR control entry module creates a received first IR control entry by said server computer system; and wherein said communicating module comprises:
 a module for sending said processed first IR control entry by said second computer to create said first IR control entry by said server computer system; and
 a module for sending said processed first IR control entry by said server computer system to create said first IR control entry of said first instance of said IR control database by said first computer.

32. The apparatus of claim 25, wherein said first IR control entry of said IR control database comprises a first IR control syntax specification.

33. The apparatus of claim 32, wherein said first IR control syntax specification comprises a number of digits in a channel specification.

34. The apparatus of claim 32, wherein said first IR control syntax specification entry comprises a delimiter specification ending an IR transmitter.

35. The apparatus of claim 32, wherein said first IR control syntax specification entry comprises a delay specification between digits of an IR transmitter.

36. The apparatus of claim 32, wherein said first IR control syntax specification entry comprises a prefix specification.

37. The apparatus of claim 36, wherein said prefix specification includes an A/B switch prefix selection.

38. The apparatus of claim 36, wherein said prefix specification includes an A/B/C switch prefix selection.

39. A system for controlling a set-top box, comprising:

an IR control database residing on a local mass storage system in a set-top unit;

wherein said set-top unit stores video and/or audio content received from said set-top box on said local mass storage system;

a module for receiving an IR control entry to create a received IR control entry;

a module for inserting said received IR control entry into said IR control database to create a first IR control entry of said IR control database;

a module for generating an IR control packet from a first IR control entry of said IR control database;

a module for controlling said set-top box by serial transmission of said IR control packet;

a raw IR control library residing on said mass storage system, which said raw IR control library contains a first raw IR control entry;

a module for parsing said first raw IR control entry of said raw IR control library to create a processed first IR control entry;

a module for communicating said processed first IR control entry to create said first IR control entry of said IR control database;

a corrections-additions database residing on said mass storage system, wherein said corrections-additions database contains a first correction data entry; and a module for parsing said first correction data entry and said first raw IR control entry to create said processed first IR control entry, wherein said IR control database contains at least one IR control entry.

* * * * *

UNITED STATES PATENT AND TRADEMARK OFFICE
CERTIFICATE OF CORRECTION

PATENT NO. : 7,484,234 B1
APPLICATION NO. : 09/558410
DATED : January 27, 2009
INVENTOR(S) : Kurt Heaton et al.

Page 1 of 1

It is certified that error appears in the above-identified patent and that said Letters Patent is hereby corrected as shown below:

On the Title page insert item --60 Related U.S. Application Data Provisional Application No. 60/131,532, filed on 04/29/1999--

In Claim 39, at column 16, line 21, after "system," delete "which" and insert therefor --wherein--

Signed and Sealed this

Twenty-fifth Day of August, 2009

David J. Kappos
*Director of the United States Patent and Trademark Office*